(12) United States Patent
Stewart et al.

(10) Patent No.: US 11,415,164 B2
(45) Date of Patent: Aug. 16, 2022

(54) RETAINER AND A RETAINER AND NUT ASSEMBLY

(71) Applicant: AlphaUSA, Livonia, MI (US)

(72) Inventors: Robert E. Stewart, Farmington Hills, MI (US); Gary A. Platukas, Novi, MI (US); Bernard Schwarb, Farmington Hills, MI (US); Rolland J. Spring, Pinckney, MI (US)

(73) Assignee: AlphaUSA, Livonia, MI (US)

( * ) Notice: Subject to any disclaimer, the term of this patent is extended or adjusted under 35 U.S.C. 154(b) by 370 days.

(21) Appl. No.: 16/659,673

(22) Filed: Oct. 22, 2019

(65) Prior Publication Data

US 2020/0124079 A1 Apr. 23, 2020

Related U.S. Application Data

(60) Provisional application No. 62/786,924, filed on Dec. 31, 2018, provisional application No. 62/749,581, filed on Oct. 23, 2018.

(51) Int. Cl.
*F16B 37/04* (2006.01)

(52) U.S. Cl.
CPC ............ *F16B 37/044* (2013.01); *F16B 37/04* (2013.01)

(58) Field of Classification Search
CPC ...... F16B 37/04; F16B 37/041; F16B 37/043; F16B 37/044; F16B 37/045; F16B 37/02; F16B 39/14; Y10S 411/97
USPC ........ 411/172, 173, 174, 175, 190–191, 517, 411/522, 523
See application file for complete search history.

(56) References Cited

U.S. PATENT DOCUMENTS

| | | | | | |
|---|---|---|---|---|---|
| 4,074,491 | A | * | 2/1978 | Bell | F16B 5/0258 411/116 |
| 4,219,064 | A | * | 8/1980 | Lozano | F16B 37/044 411/103 |
| 4,778,321 | A | * | 10/1988 | Okawa | F16B 4/004 411/533 |
| 5,338,138 | A | * | 8/1994 | Pavur | F16B 37/041 403/397 |
| 5,423,646 | A | * | 6/1995 | Gagnon | F16B 37/041 411/184 |
| 5,961,264 | A | * | 10/1999 | Postadan | F16B 37/041 411/936 |
| 6,106,207 | A | * | 8/2000 | Kuzdak, III | F16B 41/002 411/533 |
| 6,357,980 | B1 | | 3/2002 | Lansinger | |
| 6,688,825 | B1 | | 2/2004 | Stewart et al. | |

(Continued)

*Primary Examiner* — Roberta S Delisle
(74) *Attorney, Agent, or Firm* — Reising Ethington P.C.

(57) ABSTRACT

A retainer comprises first and second legs extending away from a base wall. In one embodiment, the first leg includes a dimple array surrounding an aperture and projecting from an inboard surface of the first leg. In another embodiment, the first leg has a necked portion having a set of first shoulders extending away from a first base, and a first apertured portion extending away from the set of first shoulders. The second leg has a necked and stepped portion having a step extending away from a second base, and a shouldered portion extending away from the step and having a set of second shoulders extending laterally outwardly, and a second apertured portion extending away from the second shoulders. The retainer of either embodiment may be coupled to a nut to produce a retainer and nut assembly.

13 Claims, 10 Drawing Sheets

(56) References Cited

U.S. PATENT DOCUMENTS

| | | | |
|---|---|---|---|
| 6,918,725 B2* | 7/2005 | Gauron | F16B 37/043 |
| | | | 411/112 |
| 7,648,319 B1* | 1/2010 | Ochoa | F16B 37/044 |
| | | | 411/174 |
| 9,291,179 B2 | 3/2016 | Pierce et al. | |
| 2002/0119026 A1* | 8/2002 | Gauron | F16B 37/044 |
| | | | 411/112 |
| 2004/0202523 A1* | 10/2004 | Csik | F16B 37/043 |
| | | | 411/112 |
| 2007/0224018 A1* | 9/2007 | DePerro | F16B 37/043 |
| | | | 411/175 |

\* cited by examiner

| TYPE | SIZE | MINIMUM TWIST OUT | MINIMUM PUSH OUT | G | F | E | D | M | P | L | PANEL RANGE |
|---|---|---|---|---|---|---|---|---|---|---|---|
| SHORT | M4x0.7 | 6Nm | 900N | 0.6 MAX | 6.5 REF | 13.0 / 12.7 | 10.0 / 9.5 | 22.0 / 21.0 | 12.0 / 11.5 | 3.8 MAX | 3.8 1.0 |
|  | M5x0.8 | 9Nm | 900N | 0.6 MAX | 6.5 REF | 14.0 / 13.7 | 10.5 / 10.0 | 22.0 / 21.0 | 12.0 / 11.0 | 3.8 MAX |  |
|  | M6x1.0 | 15Nm | 900N | 0.6 MAX | 6.5 REF | 15.0 / 14.7 | 11.0 / 10.5 | 24.0 / 23.0 | 14.0 / 13.0 | 4.0 MAX | 4.0 1.2 |
|  | M8x1.25 | 30Nm | 900N | 0.6 MAX | 6.5 REF | 17.0 / 16.7 | 14.0 / 13.5 | 25.5 / 24.5 | 15.0 / 14.0 | 4.0 MAX |  |
| LONG | M4x0.7 | 6Nm | 900N | 0.6 MAX | 6.5 REF | 13.0 / 12.7 | 10.0 / 9.5 | 25.0 / 24.0 | 14.5 / 13.5 | 3.8 MAX | 3.8 1.0 |
|  | M5x0.8 | 9Nm | 900N | 0.6 MAX | 6.5 REF | 14.0 / 13.7 | 10.5 / 10.0 | 27.0 / 26.0 | 17.0 / 16.0 | 3.8 MAX |  |
|  | M6x1.0 | 15Nm | 900N | 0.6 MAX | 6.5 REF | 15.0 / 14.7 | 11.0 / 10.5 | 30.0 / 29.0 | 20.0 / 19.0 | 4.0 MAX | 4.0 1.2 |
|  | M8x1.25 | 30Nm | 900N | 0.6 MAX | 6.5 REF | 17.0 / 16.7 | 14.0 / 13.5 | 32.0 / 31.0 | 21.5 / 20.5 | 4.0 MAX |  |

RETAINER AND A RETAINER AND NUT ASSEMBLY

TECHNICAL FIELD

This disclosure relates generally to fasteners and, more particularly, to retainers and retainer and nut assemblies.

BACKGROUND

Retainer and nut assemblies typically include a retainer and a nut assembled to the retainer. The retainer usually includes a base wall at a rearward portion of the retainer and first and second legs having fixed ends at the base wall and extending away from the base wall and terminating in free ends at a forward portion of the retainer. The first leg is generally planar along its length, and has a short tab extending away from an inboard surface of the first leg for locating the retainer with respect to a hole of a panel to be inserted between the legs, and also has a first apertured portion with a first aperture to accommodate passage of a threaded fastener. The second leg is generally planar along its length, and has downturned flanges at the free end, and also has a second apertured portion with a second aperture to accommodate passage of the threaded fastener into the nut. The nut is coupled to the second leg of the retainer at the second aperture. An example of such a retainer and nut assembly is disclosed in U.S. Pat. No. 6,688,825. Although such products are commercially satisfactory, their designs constrain the rate at which they can be produced, sometimes lead to premature failure of bending tooling, may require a relatively high installation force to install on a panel, and/or may not always sufficiently center a retainer with respect to a panel aperture.

SUMMARY

In one embodiment of the present disclosure, a retainer includes first and second legs extending away from a base wall, wherein, the first leg has a first apertured portion including an aperture through the first leg and a dimple array projecting from an inboard surface of the first leg, surrounding the aperture, and including at least three circumferentially spaced dimples, and the second leg has a second apertured portion corresponding to the first apertured portion of the first leg. The retainer may be coupled to a nut to produce a retainer and nut assembly.

In another embodiment of the present disclosure, a retainer comprises a base wall, and first and second legs extending away from the base wall. The first leg has a necked portion extending away from the base wall and having a first base and a set of first shoulders extending away from the first base, and a first apertured portion extending away from the set of first shoulders of the necked portion. The second leg has a necked and stepped portion extending away from the base wall and having a second base, a step extending away from the second base, and a shouldered portion extending away from the step and having a set of second shoulders extending laterally outwardly, and a second apertured portion extending away from the set of second shoulders. The retainer may be coupled to a nut to produce a retainer and nut assembly.

DETAILED DESCRIPTION

With general reference to the accompanying drawings, a retainer and a retainer and nut assembly are described below. The design of these products may facilitate a faster production rate thereof, promote longer life of bending tooling, provide a reduced installation force to install the products to a panel, and/or reliably center a retainer with respect to a panel aperture.

With reference to FIGS. 1 through 4, a retainer and nut assembly 10 includes a retainer 12 and a nut 14 assembled to the retainer 12.

The nut 14 may be staked, fastened, welded, brazed, adhered, or coupled to the retainer 12 in any other manner suitable for producing retainer and nut assemblies. The nut 14 may be composed of metal, for instance, steel, more specifically, SAE 1035 steel heat-treated to achieve published property class 10 performance standards. The nut 14 may be a square nut, as illustrated, or may be of round, or any other shape suitable for use with retainer and nut assemblies.

The retainer 12 may be composed of metal, for instance, stainless steel, and may be cold-rolled martensitic steel having a zinc nickel plating and having a thickness of, for example, 0.6 mm to 0.8 mm including all ranges, sub-ranges, endpoints, and values in that range.

Figure 1:
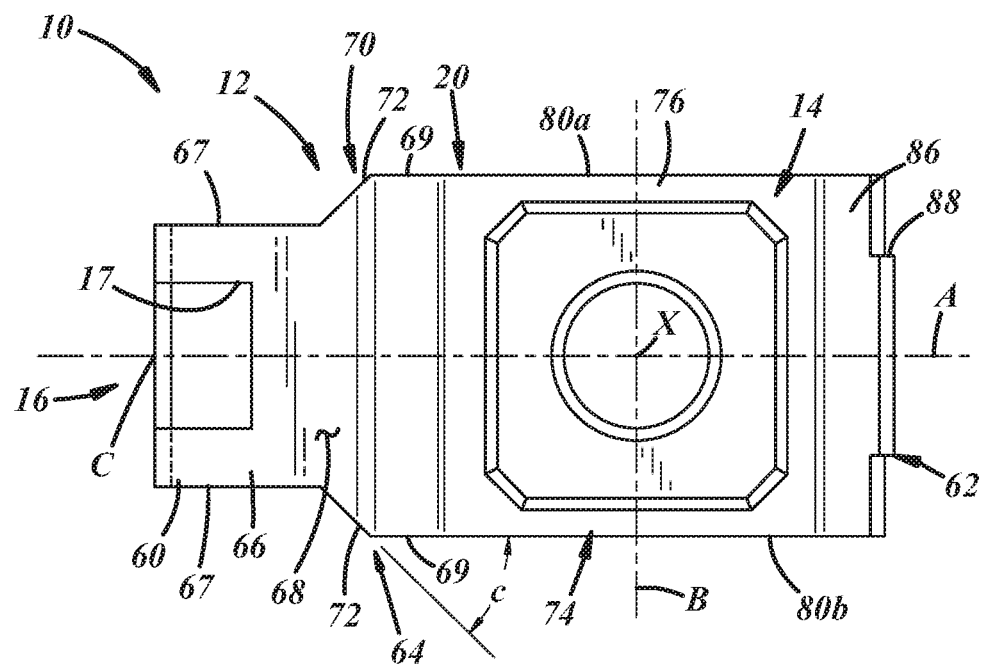
FIG. 1 illustrates a top view of a retainer and nut assembly according to an embodiment of the present disclosure, and including a retainer and a square nut coupled to the retainer.
Figure 2:
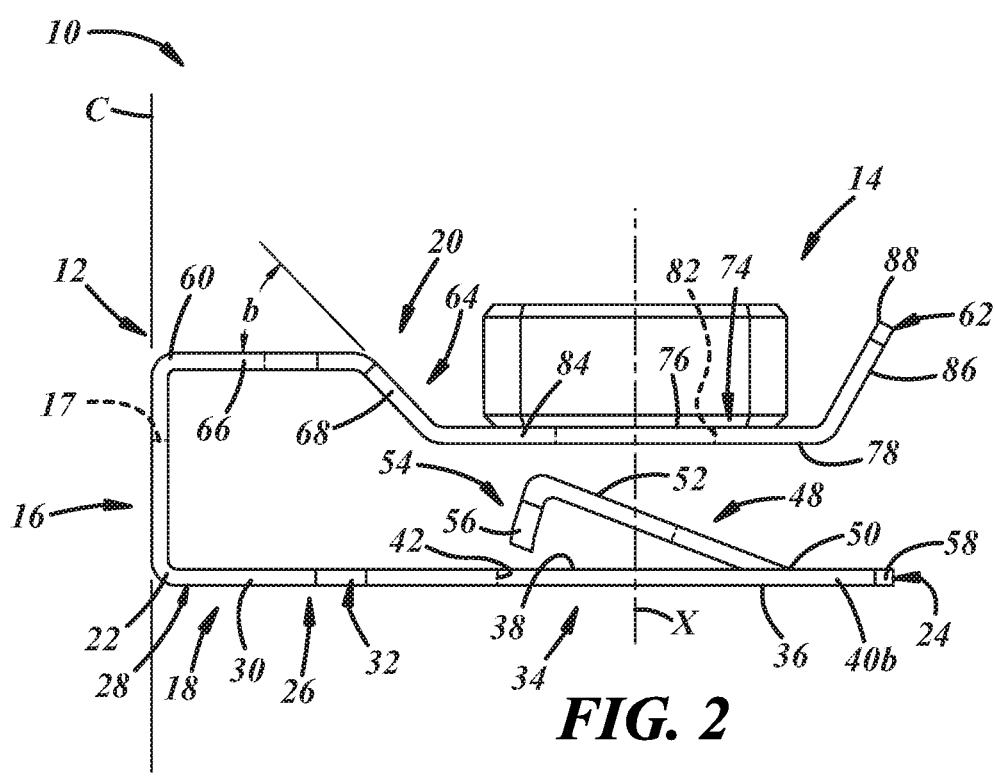
FIG. 2 illustrates a side view of the assembly of FIG. 1.
Figure 3:
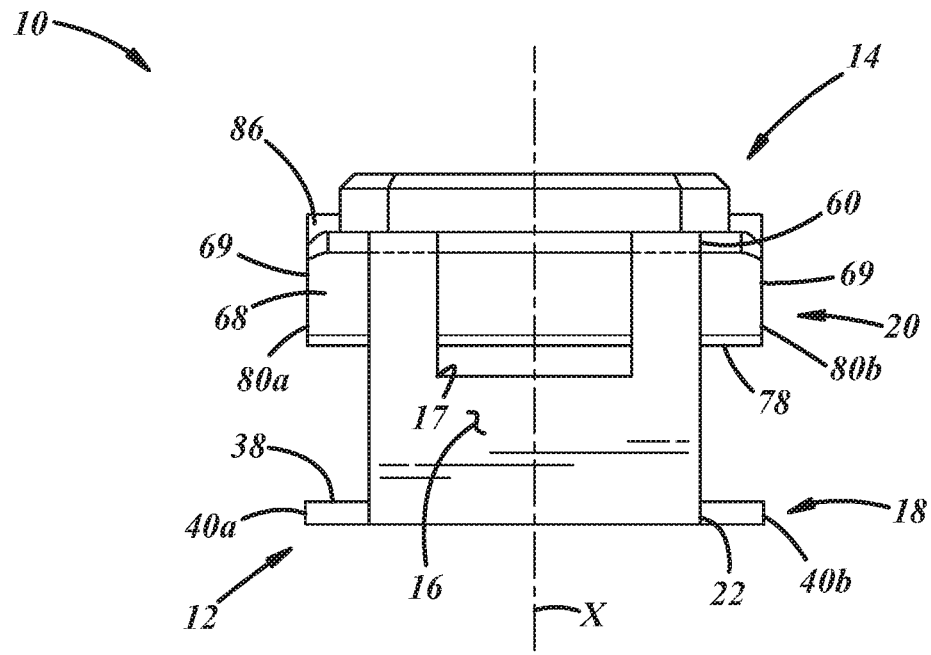
FIG. 3 illustrates a rear end view of the assembly of FIG. 1.
Figure 4:
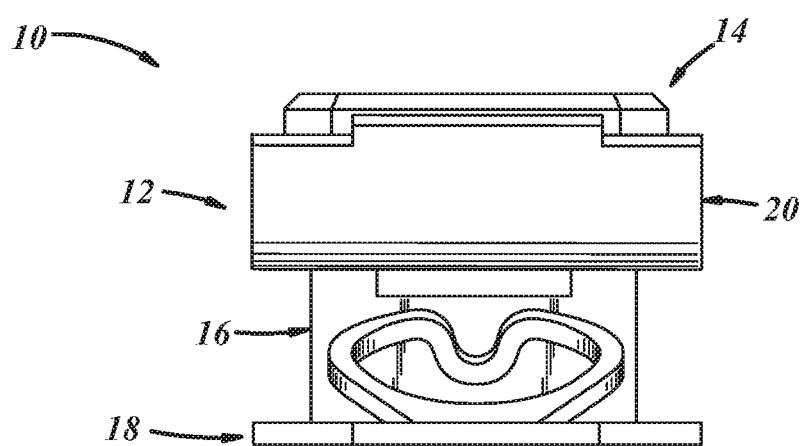
FIG. 4 illustrates a front end view of the assembly of FIG. 1.

With reference to FIGS. 1 and 2, the retainer 12 includes retainer axes including a longitudinal axis A, a lateral axis B perpendicular to the longitudinal axis A, a transverse axis C transverse to and rearwardly offset from the longitudinal and lateral axes A, B, and a fastening axis X perpendicular to and intersecting the longitudinal and lateral axes A, B. The retainer 12 also includes a base wall 16 at a rearward portion of the retainer 12 and extending along the transverse axis C. The retainer 12 further includes first and second legs 18 (FIG. 2), 20 extending along the longitudinal axis A away from the base wall 16 and terminating at a forward portion of the retainer 12. The base wall 16 and the second leg 20 may be aperture, for example, to include an aperture 17 overlapping corresponding portions of the base wall 16 and the second leg 20.

Figure 5:
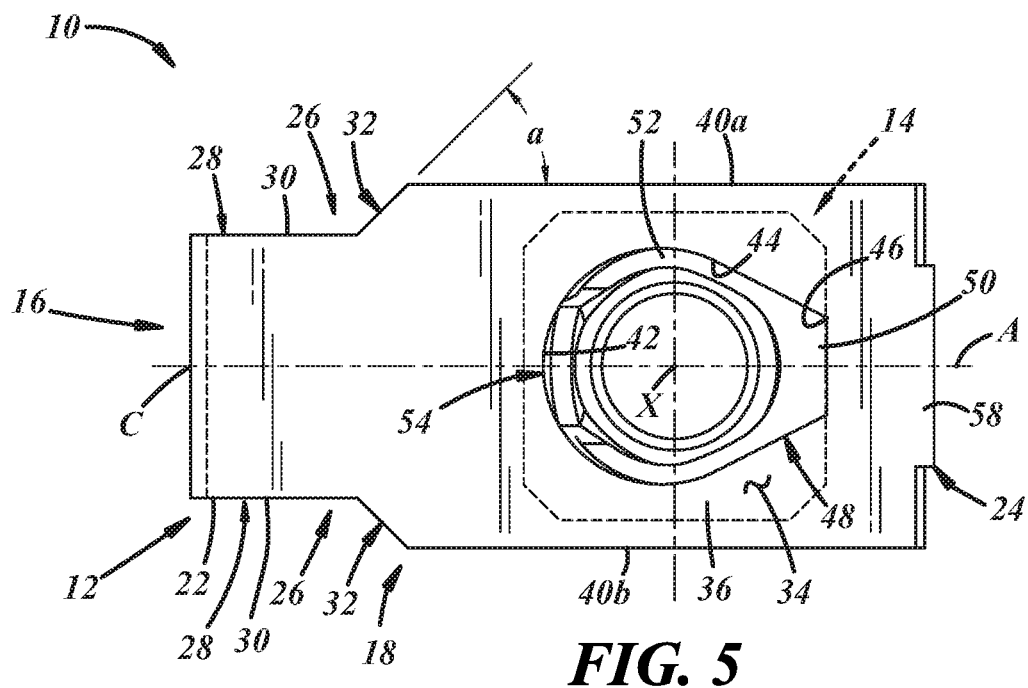
FIG. 5 illustrates a bottom view of the assembly of FIG. 1.

With reference to FIGS. 2 and 5, the first leg 18 includes a first fixed end 22 at a lower end of the base wall 16, a first free end 24 distal the first fixed end 22, and a necked portion 26 extending away from the first fixed end 22. The necked portion 26 includes a first base 28 extending away from the first fixed end 22 and having straight lateral sides 30, and a set of first shoulders 32 extending away from the first base 28. The first shoulders 32 may be straight-tapered, for example, extending at an angle a between forty and fifty degrees including all ranges, sub-ranges, endpoints, and values in that range. The first leg 18 also includes a first apertured portion 34 extending in a direction away from the first shoulders 32 of the necked portion 26 toward the first free end 24, and being coplanar with the necked portion 26.

The first apertured portion 34 includes a first outboard surface 36, a first inboard surface 38, first laterally opposite sides 40*a*, 40*b* that may be straight and extending between the first outboard and inboard surfaces 36, 38, and a first aperture 42 being disposed between the first laterally opposite sides 40*a*, 40*b* and the first outboard and inboard surfaces 36, 38. The first aperture 42 may have a truncated teardrop shape with a teardrop-shaped portion 44 and a truncated portion 46 between the teardrop-shaped portion 44 and the first free end 24. The first apertured portion 34 also may include a hinged tab 48 having a hinged portion 50 connected to the truncated portion 46 of the first aperture 42, and a body 52 extending from the hinged portion 50 in a rearward direction and toward at least one of the base wall 16 or the second leg 20 over a distance that is more than half way across a space between apertured portions of the first and second legs 18, 20 and terminating in a free end 54 with a projection 56 extending back toward the first leg 18. The first apertured portion 34 further may include a tab or tang 58 terminating in the first free end 24.

With reference to FIGS. 1 and 2, the second leg 20 includes a second fixed end 60 at an upper end of the base wall 16, a second free end 62 distal the second fixed end 60, and a necked and stepped portion 64 including a second base 66 extending away from the second fixed end 60 toward the second free end 62. The second base 66 may be planar, and may have straight lateral sides 67. The necked and stepped portion 64 also may include a step 68 extending away from the second base 66 in a forward direction and toward the first leg 18. The step 68 may have straight lateral sides 69, and may be straight-angled at an angle b between forty and fifty degrees including all ranges, sub-ranges, endpoints, and values in that range. The necked and stepped portion 64 further may include a shouldered portion 70 extending away from the step 68 and having a set of second shoulders 72 extending laterally outwardly. The shoulders 72 may be straight-tapered at an angle c between forty and fifty degrees including all ranges, sub-ranges, endpoints, and values in that range. The second leg 20 also may include a second apertured portion 74 extending away from the second shoulders 72 and toward the second free end 62.

The second apertured portion 74 may have a second outboard surface 76, a second inboard surface 78 facing the first inboard surface 38 of the first leg 18, second laterally opposite sides 80*a*, 80*b* that may be straight and extending between the second outboard and inboard surfaces 76, 78, and a second aperture 82 being disposed between the second laterally opposite sides 80 and the second outboard and inboard surfaces 76, 78. The second aperture 82 may be round or of any other shape suitable for coupling to a nut. The second inboard surface 78 may have an indented portion 84.

The nut 14 may be coupled to the second leg 20 of the retainer 12 at the second aperture 82 and cooperating with the indented portion 84 to couple the retainer 12 to the nut 14. In one example, the indented portion 84 may be part of the second apertured portion 74 that has been staked, pressed, or otherwise formed to a corresponding portion of the nut 14. In any case, the surface 78 may be planar such that the nut-to-retainer connection does not project beyond the surface 78 and into the space between the legs 18, 20 to allow for smooth insertion over a panel (not shown).

The second leg 20 also may have a flange 86 extending away from the second apertured portion 74 in an outboard direction. The flange 86 is angled with respect to the second apertured portion 74 at an angle between fifty-five and sixty degrees including all ranges, sub-ranges, endpoints, and values in that range. The flange 86 may have a tab or tang 88 that terminates in the second free end 62.

Figure 6:
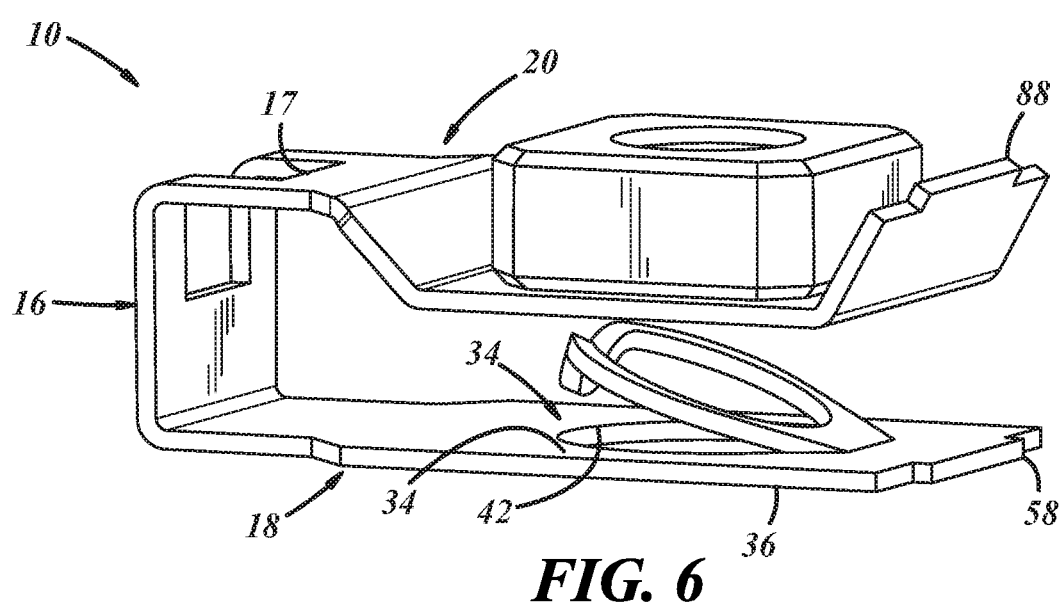
FIG. 6 illustrates an upper perspective view of the assembly of FIG. 1.

With reference to FIG. 6, the tangs 58, 88 may facilitate separation of a series of retainer blanks from a strip of metal. The tangs 58, 88 may be rectangular and have a width that is less than the overall width of the retainer 12, but greater than or equal to a minimum width necessary to connect serial retainer blanks without bending/buckling of the strip when the strip is advanced through a forming machine. Preferably, the width of each tang 58, 88 is less than the width of the base wall 16 of the retainer 12. The length of the tangs 58, 88 may be 0.015" to 0.045" including all ranges, sub-ranges, endpoints, and values in that range. The tangs 58, 88 enable a clean cutoff of each retainer 12 from its neighboring retainer in the metal strip, yet allow some variation in cut location from part to part. Also, locating the cutoffs across the narrower tangs 58, 88, instead of across the entire width of the metal strip from which the retainers 12 are formed, facilitates breaking sharp edges/corners using a radius or angle cut. To carry out the radius or angle cut without the tangs 58, 88 would require cutoff scrap where nose and tail are of differing shapes. Thus, the tang design allows for a simple scrapless cutoff for reduction of material waste.

Figure 7:
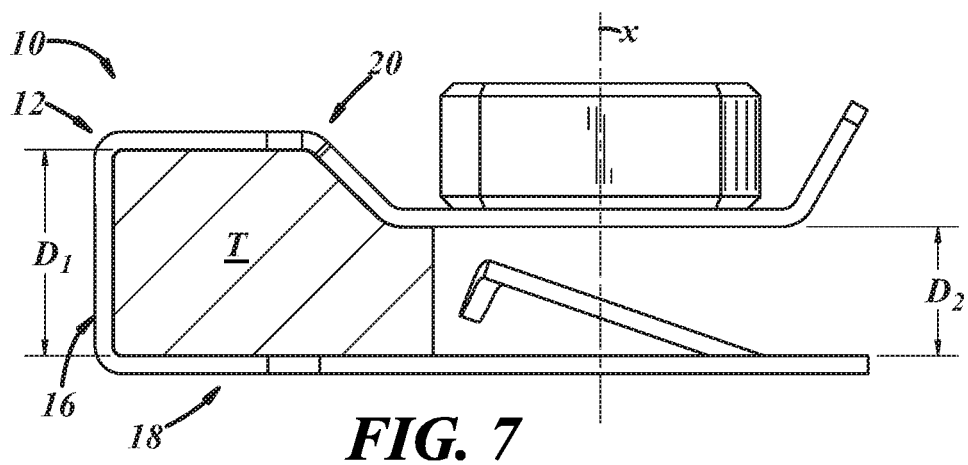
FIGS. 7 and 8 illustrate alternate side views of the assembly of FIG. 1.

With reference to FIG. 7, the retainer 12 may be humpbacked. In general, a distance between the legs 18, 20 at a rearward portion of the retainer 12 may be significantly greater than a distance between the legs 18, 20 at a forward portion of the retainer 12, wherein the distances are measured parallel to the fastening axis X. More specifically, a distance $D_1$ between the first and second bases 28, 66 may be significantly greater than a distance $D_2$ between the first and second apertured portions 34, 74, wherein the distances $D_1$, $D_2$ are measured parallel to the fastening axis X. The humpbacked design facilitates use of a center form tool T, over which the retainer 12 is bent into shape, that is larger than it would otherwise be without the humpback. The larger center form tool T may be helpful in providing additional mass and size that may be useful in withstanding high forces applied in bending the retainer 12 into shape from flat stock. Accordingly, useful life of the center form tool T may be extended.

The humpback design, being more square and less oblong compared to prior art designs, provides a useful feature. The more square-like base wall 16 can be pushed onto a panel (not shown) until an inboard surface of the base wall 16 fully contacts a panel edge (not shown). This allows for very quick and consistent installation of the assembly 10. The more oblong-shaped base wall of prior art retainers may not engage a panel edge squarely and securely, because the panel edge may engage at various points of contact along radii of bends between the base wall and the legs. The more square-like base wall 16 of the present disclosure provides a large, strong and solid contact patch against a panel edge for greater resistance to retainer assembly twist failure during assembly operations. Again, the prior art oblong base wall tends to be inferior in that all the assembly forces are localized because the parts engage only at point of contact along the radii, thereby leaving the oblong base wall more likely to be damaged, twisted, deformed, or fractured during assembly rundown.

Figure 8:
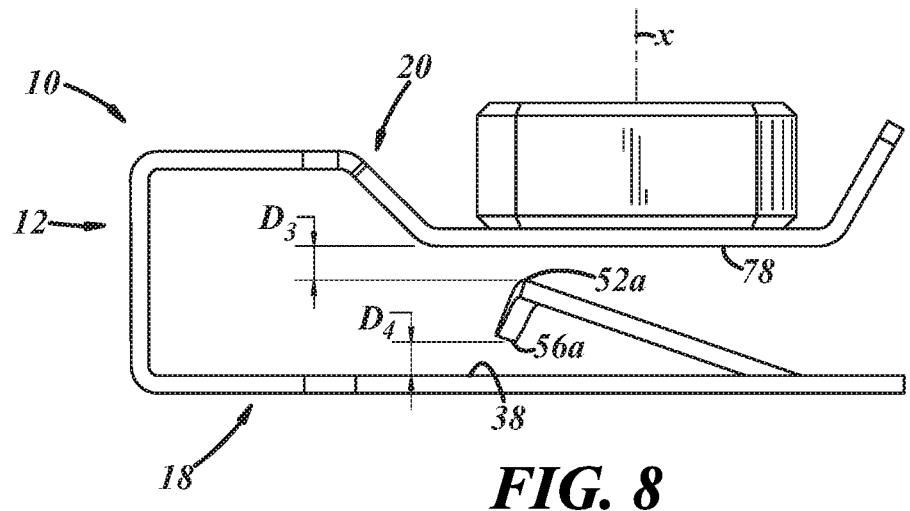

With reference to FIG. 8, a distance $D_3$ between an uppermost or inboard surface 52*a* of the hinged tab 48 of the first leg 18 and a lowermost or inboard surface 78 of the apertured portion 74 of the second leg 20 may be less than a minimum thickness of a panel (not shown) to which the retainer 12 is to be coupled. Likewise, a distance $D_4$ between a lowermost or outboard surface 56*a* of the projection 56 of the hinged tab 48 and an uppermost or inboard surface 38 of the apertured portion 34 of the first leg 18 may be less than a minimum thickness of a panel (not shown) to which the retainer 12 is to be coupled. The distances $D_3$, $D_4$ are measured parallel to the fastening axis X.

Figure 9:
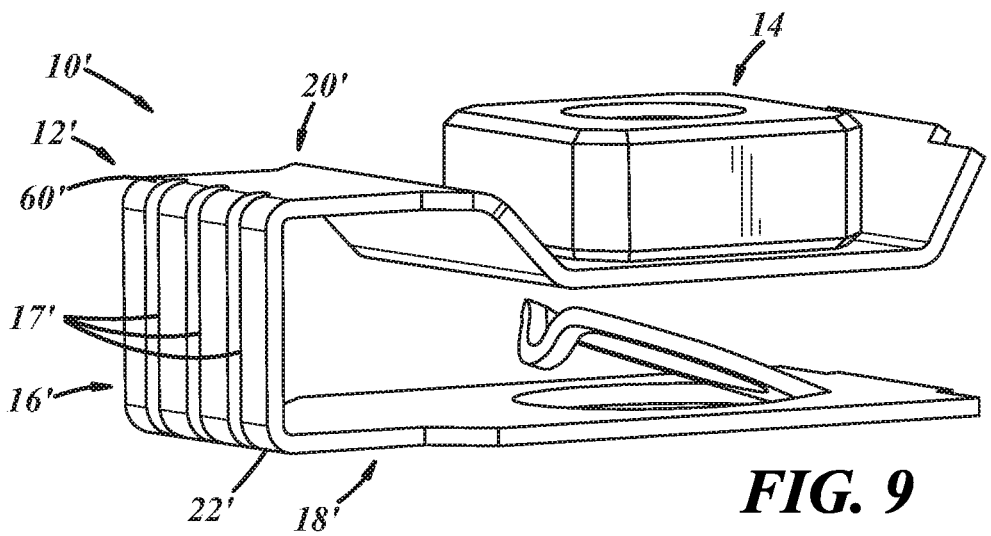
FIG. 9 illustrates a retainer and nut assembly according to another embodiment of the present disclosure, and including a retainer having a slotted base wall.

FIG. 9 shows another illustrative embodiment of a retainer and nut assembly 10'. This embodiment is similar in many respects to the embodiment of FIGS. 1 through 8 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

With reference to FIG. 9, the assembly 10' includes a retainer 12' including a base wall 16' having one or more slots 17'. Each slot 17' may extend lengthwise in a general direction from one end of the base wall 16' to another. The slots 17' may extend from a first leg 18' to a second leg 20' through bends or fixed ends 22', 60' of the legs 18', 20', as illustrated. In other embodiments, the slots 17' may extend through one or the other of the two bends 22', 60', and/or not necessarily over the entire height of the base wall 16'. In still other embodiments, each slot 17' need not be continuous and may be interrupted over its length. Each slot 17' may have a width, and a height/length that is greater than the width. The width of any given individual slot 17' may be between 0.050" and 0.150" including all ranges, sub-ranges, endpoints, and values in that range. More specifically, the width of any given individual slot 17' may be between 0.060" and 0.125" including all ranges, sub-ranges, endpoints, and values in that range. Similarly, the width of any given solid portion of the base wall 16' between the slots 17' may be between 0.060" and 0.125". The collective width of the slots 17' may be between 25% and 75% (including all ranges, sub-ranges, endpoints, and values in that range) relative to the total width of the base wall 16'.

The slots 17' may provide a comb-like base wall 16'. In one example, in some embodiments, the slots 17' may be arranged to be of the same length, same longitudinal position, same width, and/or same lateral spacing. In another example, in other embodiments, the slots 17' may be arranged to be of different lengths, different longitudinal positions, different widths, and/or different lateral spacing.

The comb-like configuration of the base wall 16' may help uniformly distribute forming/bending forces across a center form tool and lower forces needed to form the part generally. More specifically, the slots 17' may be useful in reducing the forces required to bend the retainer 12' into shape over a center forming tool, particularly when the retainer 12' is composed of preheat-treated steel (e.g., M130, M160, etc.). Also, the slotted base wall 16' may act as an anti-rotation feature when a bolt (not shown) is threaded into the nut 14, wherein as fastening forces build up, the slots 17' close up to increase twist resistance without having to increase part weight. Additionally, the slots 17' may result in lower installation forces used to install the assembly 10' to a panel (not shown) by allowing flexure of the retainer 12'. Furthermore, the slots 17' may be more ergonomically correct than a single large rectangular aperture. One example of such an ergonomic benefit regarding the comb-like cut out structure is that the assembly 10' may be installed to a panel even with oily or greasy fingers of someone who is installing the assembly 10' to the panel. This is because the narrow slots 17' provide a good traction surface, and excess oil or grease from an installer's fingers is given an escape path through the slots 17', assuring that the oil/grease will not become trapped between the assembly 10' and the installer's finger and, thus, will not lead to slippage between the installer's finger and the assembly 10'.

Figure 10:
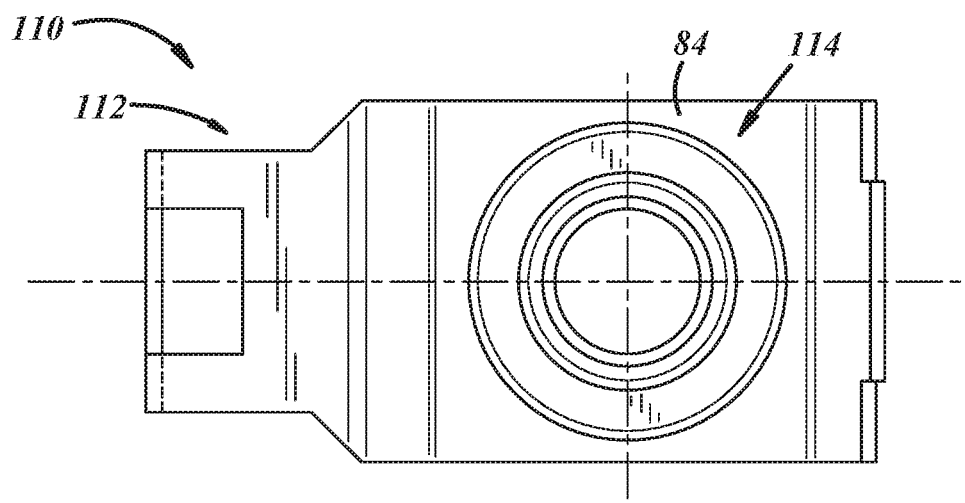
FIG. 10 illustrates a top view of a retainer and nut assembly according to another embodiment of the present disclosure, and including a round nut.
Figure 11:
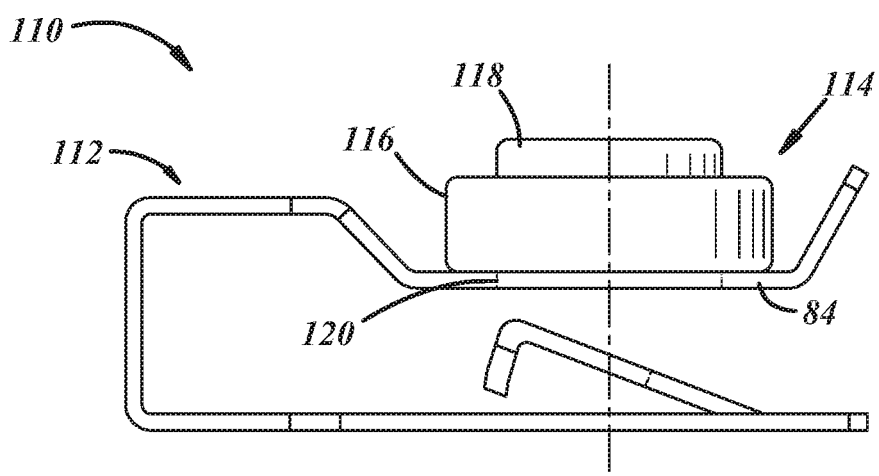
FIG. 11 illustrates a side view of the assembly of FIG. 10.
Figure 12:
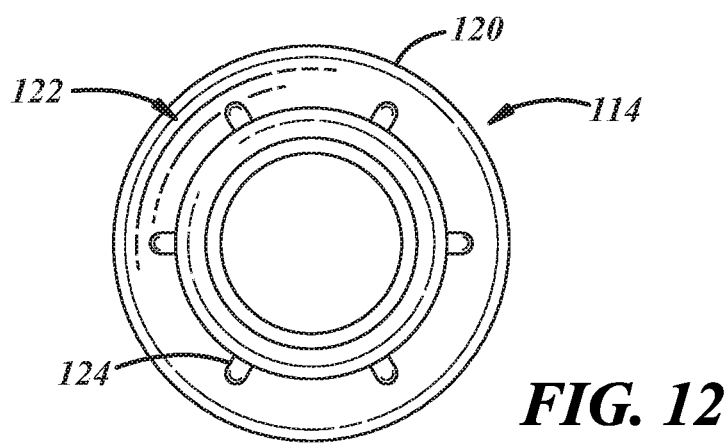
FIG. 12 illustrates an enlarged bottom view of the nut of FIG. 10.

FIGS. 10 through 12 show another illustrative embodiment of a retainer and nut assembly 110. This embodiment is similar in many respects to the embodiment of FIGS. 1 through 9 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

With reference to FIGS. 10 through 12, a retainer and nut assembly 110 includes a round nut 114 that may include a collar 116, a free end boss 118 extending from the collar 116, and a fixed end boss 120 extending from the collar 116 in a direction opposite that of the free end boss 118. The nut 114 also may include a circumferentially extending recess or channel 122 in an undersurface of the collar 116 to accept the indented portion 84 of the retainer 12 when the retainer 12 is staked to the nut 114, and radially extending ribs 124 in the channel 122 to cooperate with the indented portion 84 of the retainer 12 to resist rotation of the nut 114 with respect to the retainer 12.

The nut 14, 114 whether square or round, may be a low-profile, self-piercing nut that is easily automated for faster nut delivery speeds into a production die. Such nuts need only be oriented to prevent an upside-down condition and are not prone to tipping over inside an orientation section of an automation system. Such nut styles do not require the complicated orientation automation that hexagonal flange nuts do. The nut 14, 114 is attached by packing corresponding retainer material from the indented portion 84 into the recess or channel 122 on the bottom of the nut 14, 114 and flaring out the tubular collar 116 of the nut 14, 114 for retention of the nut 14, 114 to the retainer material. This flared collar attachment can be applied much faster and with a much shorter machine stroke than shaved metal staking along the length of a hexagonal flange nut's hexagonal corners. The short flared collar attachment and low profile of the nut 14, 114 allows for minimal strip lift in a production die. A top leading edge of the low-profile nut 14, 114 presents a smooth flat chamfered edge that is easier to push through the production tooling very quickly without catching and buckling the part strip. The low strip lift and smooth chamfered nut edge allows production of the assembly 10 at much faster speeds than a hexagonal flange nut.

Notably, the presently disclosed retainer 12 need not include an apertured base wall 16, or, more specifically, the illustrated aperture 17 overlapping portions of the base wall 16 and the second leg 18. Also notably, the presently disclosed retainer 12 need not include a downturned flange, more specifically, the second leg 20 of the retainer 12 need not include any downturned flange(s) at the free end thereof and/or at lateral sides thereof.

Figure 13:
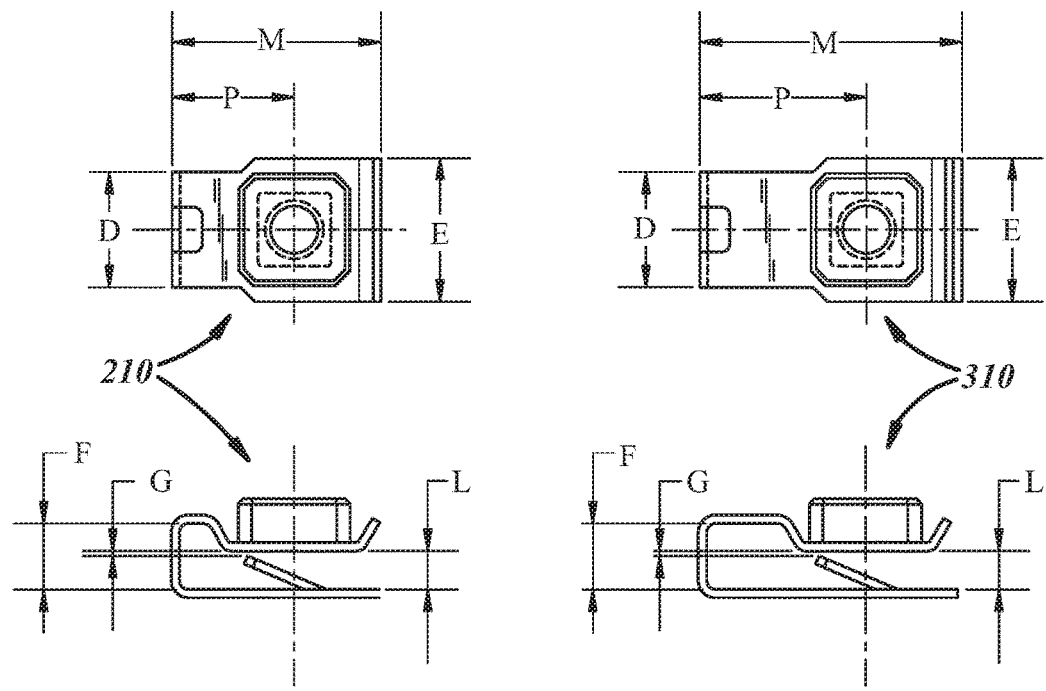
FIG. 13 illustrates a specification diagram for the retainer and nut assembly of the present disclosure.

FIG. 13 illustrates a specification diagram including short and long versions 210, 310 of a retainer and nut assembly with various relevant dimensions in millimeters. The present disclosure includes a tolerance range around feature dimensions of plus or minus ten percent including all ranges, sub-ranges, endpoints, and values in that tolerance range.

The present disclosure includes any and all ratios or proportions between dimensions of any and all features of the disclosed retainer and nut assemblies 10, 10', 110, 210, 310. For example, the present disclosure includes F/D, F/L, D/E, and any other ratios or proportions. Likewise, the present disclosure includes a tolerance range around such ratios or proportions of plus or minus ten percent including all ranges, sub-ranges, endpoints, and values in that tolerance range.

A ratio between the height F of the base wall to the width D of the base wall may be between 0.62 and 0.92 including all ranges, sub-ranges, endpoints, and values in that range.

A ratio between the height F of the base wall and a height L of a space between the apertured portions of the legs may be between 1.4 and 2.0 including all ranges, sub-ranges, endpoints, and values in that range.

A ratio between the width D of the base wall and the width E of the free ends of the legs may be between 0.5 and 1.2 including all ranges, sub-ranges, endpoints, and values in that range.

FIGS. 14 through 19 show another illustrative embodiment of a retainer and nut assembly 410. This embodiment is similar in many respects to the embodiment of FIGS. 1 through 13 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 14:
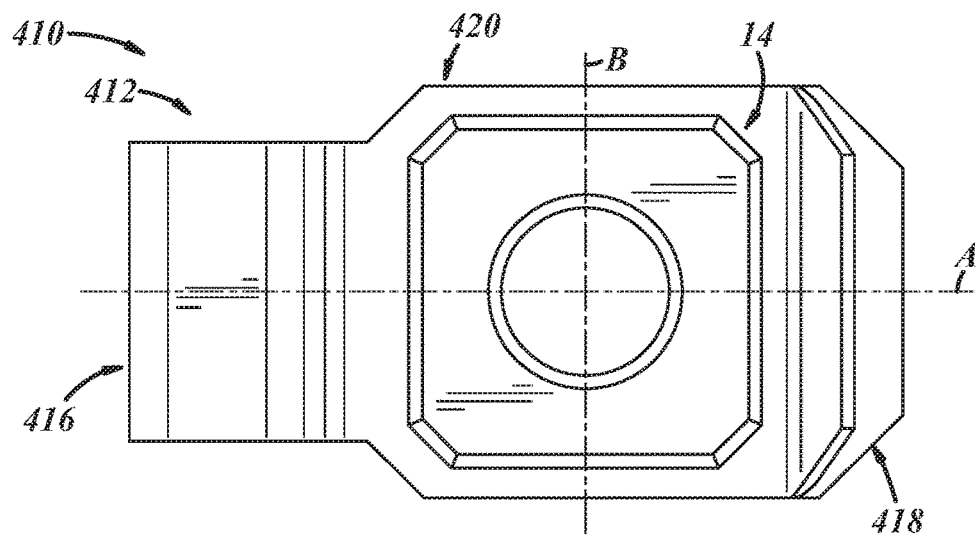
FIG. 14 illustrates a top view of a retainer and nut assembly according to a further embodiment of the present disclosure, and including a retainer having first leg with a dimple array projecting from an inboard surface of the first leg.
Figure 15:
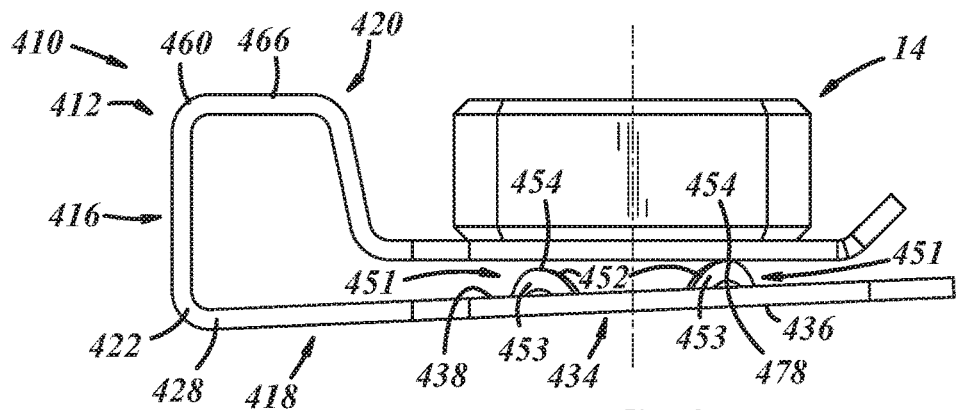
FIG. 15 illustrates a side view of the assembly of FIG. 14.
Figure 16:
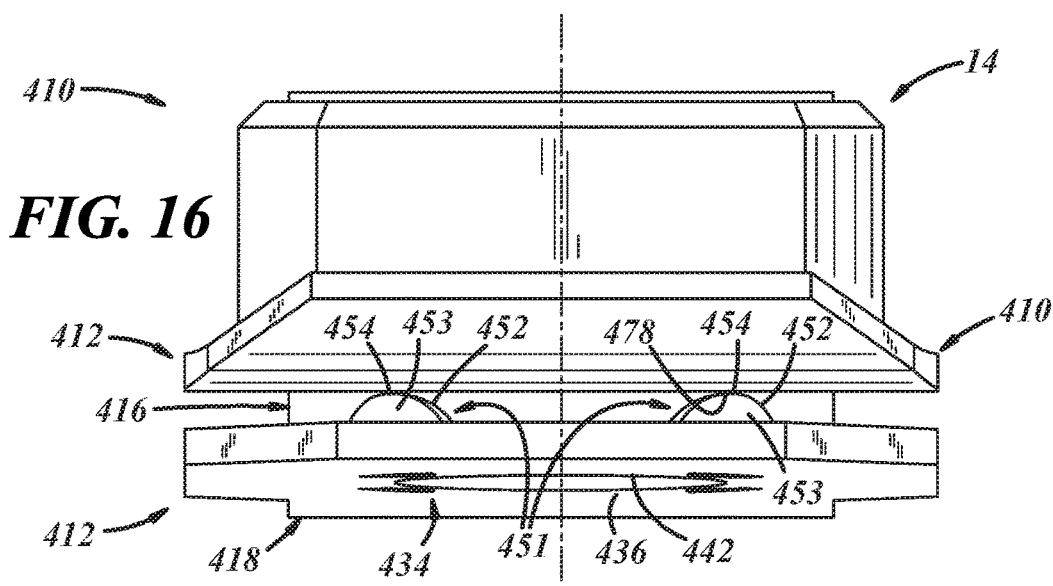
FIG. 16 illustrates an enlarged front view of the assembly of FIG. 14.

With reference to FIGS. 14 through 16, the retainer and nut assembly 410 includes a retainer 412 and the nut 14 assembled to the retainer 412. The retainer includes a base wall 416, and first and second legs 418, 420 extending away from the base wall 416.

With reference to FIGS. 15 and 16, the first leg 418 includes a first apertured portion 434 including a first outboard surface 436, a first inboard surface 438 (FIG. 15), and a first aperture 442 (FIG. 16) being disposed between the first outboard and inboard surfaces 436, 438. The first apertured portion 434 also includes a dimple array including a plurality of dimples 451 projecting from the inboard surface 438 of the first leg 418, surrounding the first aperture 442. The dimple array includes at least three dimples 451 and, as illustrated, may include four dimples 451. The dimples 451 may be equidistantly circumferentially spaced apart from one another. Also, two of the illustrated four dimples 451 may be disposed on one side of the longitudinal axis A (FIG. 14) and the other two of the four dimples 451 may be disposed on another side of the longitudinal axis A, such that the longitudinal axis A does not intersect any one dimple. Likewise, two of the four dimples 451 may be disposed on one side of the lateral axis B (FIG. 14) and the other two of the four dimples 451 may be disposed on another side of the lateral axis B, such that the lateral axis B does not intersect any one dimple.

The dimples 451 may terminate in free ends 454. The free end 454 of at least one of the dimples 451 may contact a corresponding portion of an inboard surface 478 of the second leg 420. Accordingly, as illustrated in FIG. 15, an angle between the base wall 416 and the first leg 418 may be acute, i.e., less than ninety degrees, for example, between 85 and 89.9 degrees including all ranges, sub-ranges, endpoints, and values in that range.

Figure 17:
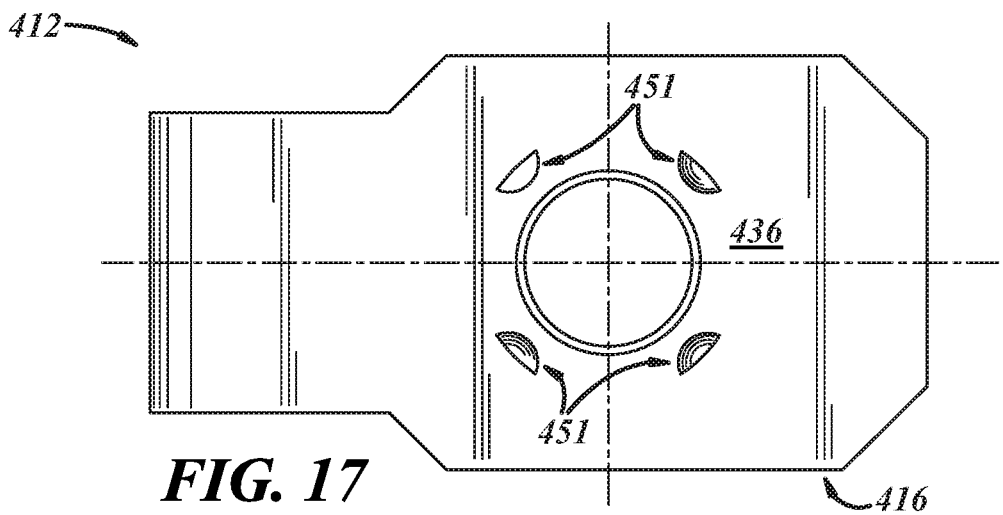
FIG. 17 illustrates a bottom view of the assembly of FIG. 14.
Figure 18:
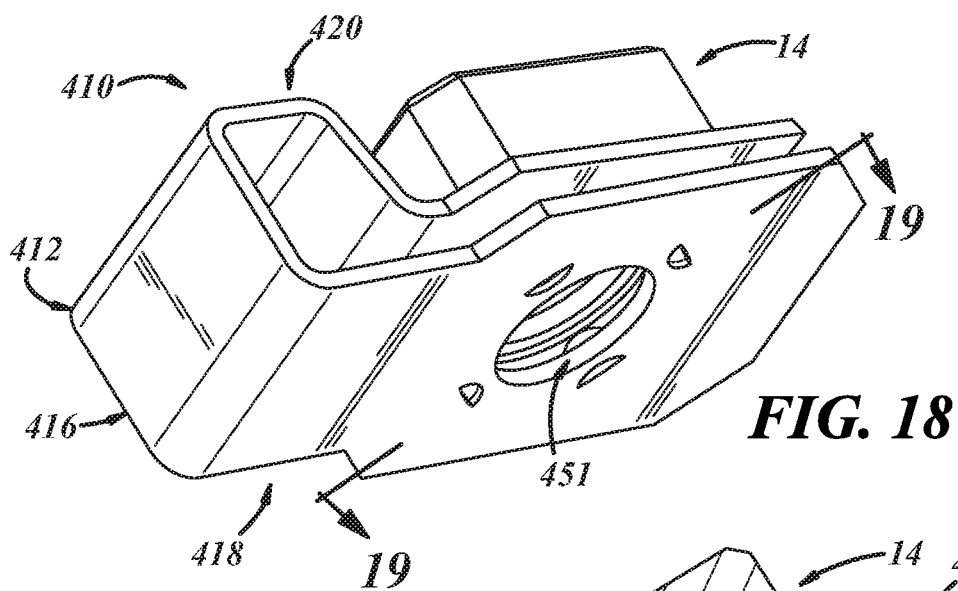
FIG. 18 illustrates a lower perspective view of the assembly of FIG. 14.
Figure 19:
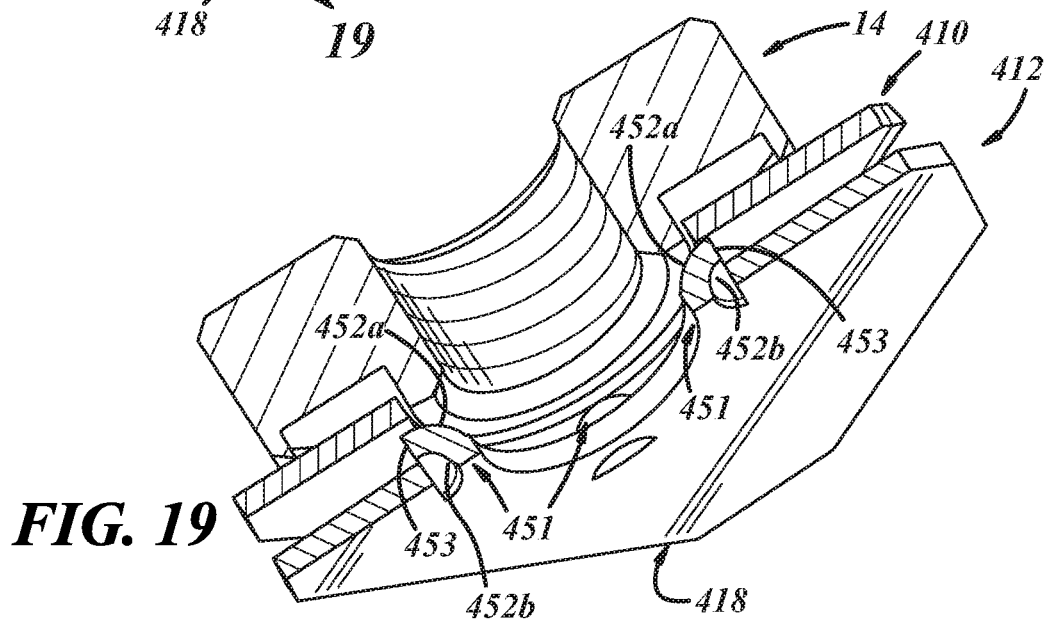
FIG. 19 illustrates an enlarged cross-sectional view of the assembly of FIG. 14, taken along line 19-19 of FIG. 18.

With reference to FIGS. 17 through 19, the dimples 451 may be shell-shaped. More specifically, the dimples 451 may be quarter-spherical-shaped. For example, the dimples 451 may be formed with a dimple punch and die in a forming machine. Accordingly, the dimples 451 may be projections displaced from the first leg 418. In any case, the dimples 451 may include rounded bodies 452 of curvate shape, with excurvate inboard surfaces 452a (FIG. 19) facing radially inwardly, corresponding incurvate outboard surfaces 452b (FIG. 19) facing radially outwardly, and faces 453 facing radially outwardly.

The dimples 451 provide reliable assembling, centering, and locating of the retainer 412 with respect to a corresponding aperture in a panel to which the retainer 412 is to be coupled. In particular, the rounded or excurvate shape of the bodies 452 of the dimples 451 help to introduce the dimples 451 within the corresponding panel aperture as the retainer 412 is being assembled to the panel, and help keep the dimples 451 centered within the panel aperture for maintaining good location of the retainer 412 with respect to the panel.

FIGS. 20 through 25 show another illustrative embodiment of a retainer and nut assembly 510. This embodiment is similar in many respects to the embodiment of FIGS. 1 through 19 and like numerals between the embodiments generally designate like or corresponding elements throughout the several views of the drawing figures. Accordingly, the descriptions of the embodiments are hereby incorporated into one another, and description of subject matter common to the embodiments generally may not be repeated.

Figure 20:
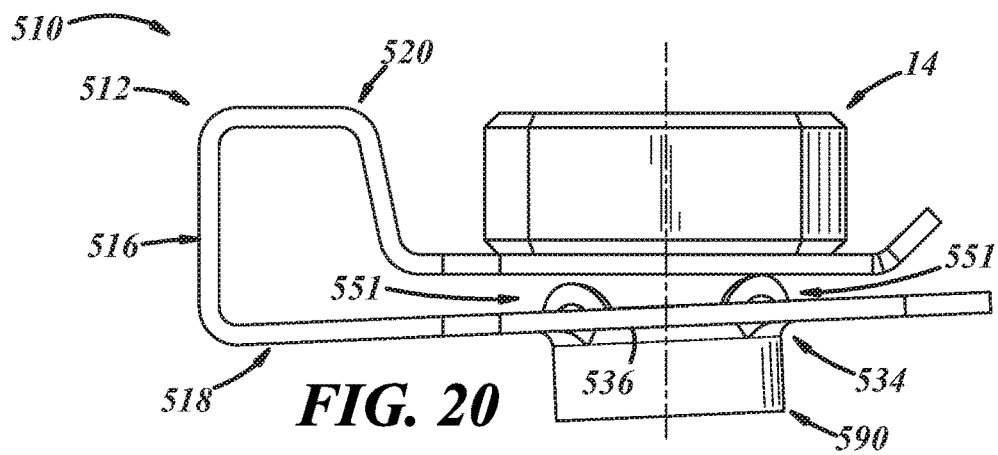
FIG. 20 illustrates a side view of a retainer and nut assembly according to an additional embodiment of the present disclosure, and including a retainer having a first leg with a ring projecting from an outboard surface of the first leg and a dimple array surrounding the ring and projecting from an inboard surface of the first leg.
Figure 21:
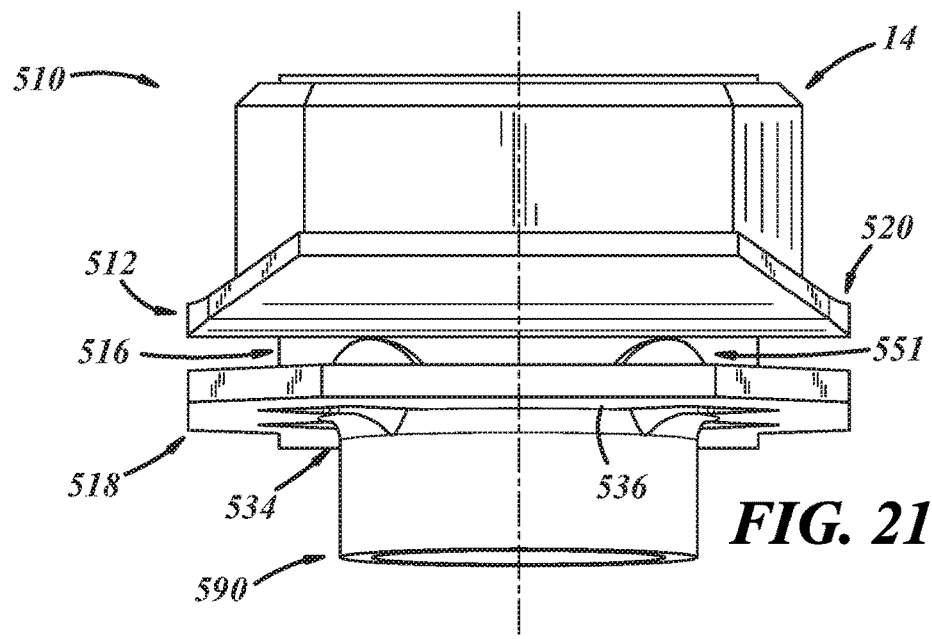
FIG. 21 illustrates an enlarged front view of the assembly of FIG. 20.

With reference to FIGS. 20 and 21, the retainer and nut assembly 510 includes a retainer 512 and the nut 14 assembled to the retainer 512. The retainer includes a base wall 516, and first and second legs 518, 520 extending away from the base wall 516. With additional reference to FIG. 22, the first leg 518 includes an apertured portion 534 including a dimple array projecting from an inboard surface of the first leg 518 with a plurality of dimples 551, and a ring 590 projecting in an outboard direction away from an outboard surface 536 of the apertured portion 534. The ring 590 may have a length that is several times greater than the wall thickness of the apertured portion 534 of the first leg 518.

Figure 22:
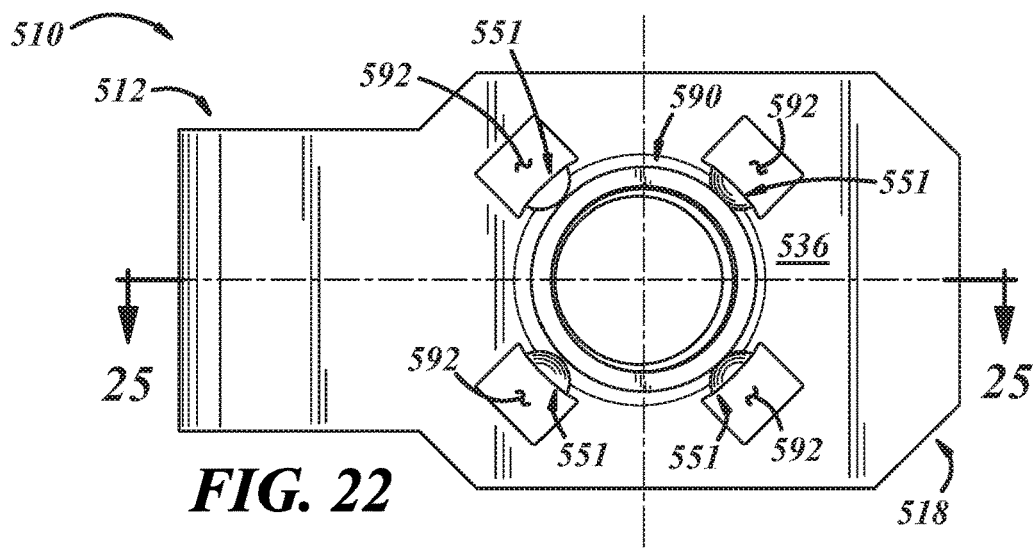
FIG. 22 illustrates a bottom view of the assembly of FIG. 20.

With reference to FIG. 22, because the long ring 590 may render it difficult to produce the dimples 551, the apertured portion 534 also includes a cutout array corresponding to the dimple array, and including a plurality of cutouts 592 corresponding to the plurality of dimples 551. In one example, the cutouts 592 may be may be formed with a cutout punch and die in a forming machine and, once the cutouts 592 are formed, then the dimples 551 may be formed with a dimple punch and die in the forming machine.

Figure 23:
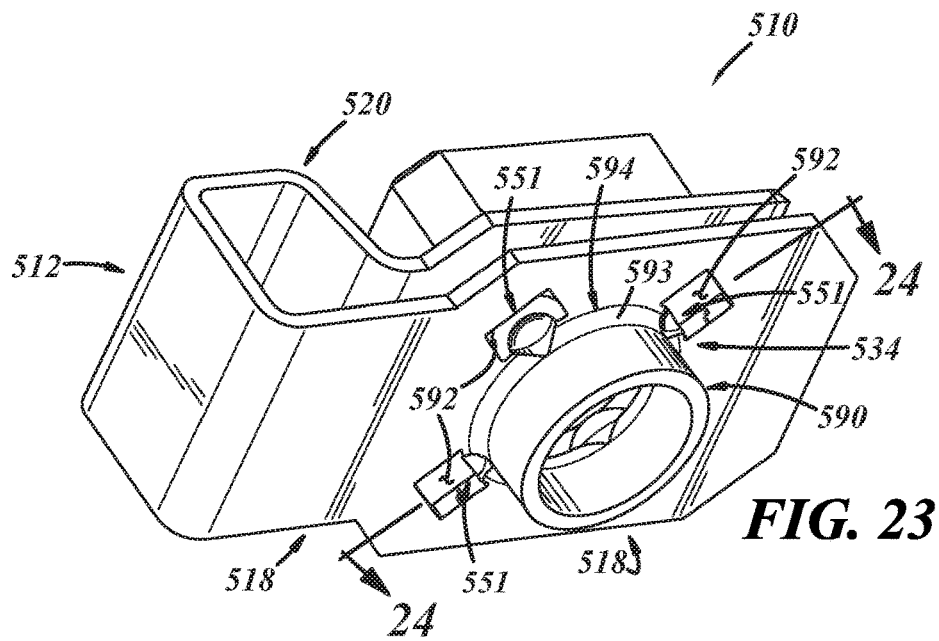
FIG. 23 illustrates a lower perspective view of the assembly of FIG. 20.
Figure 24:
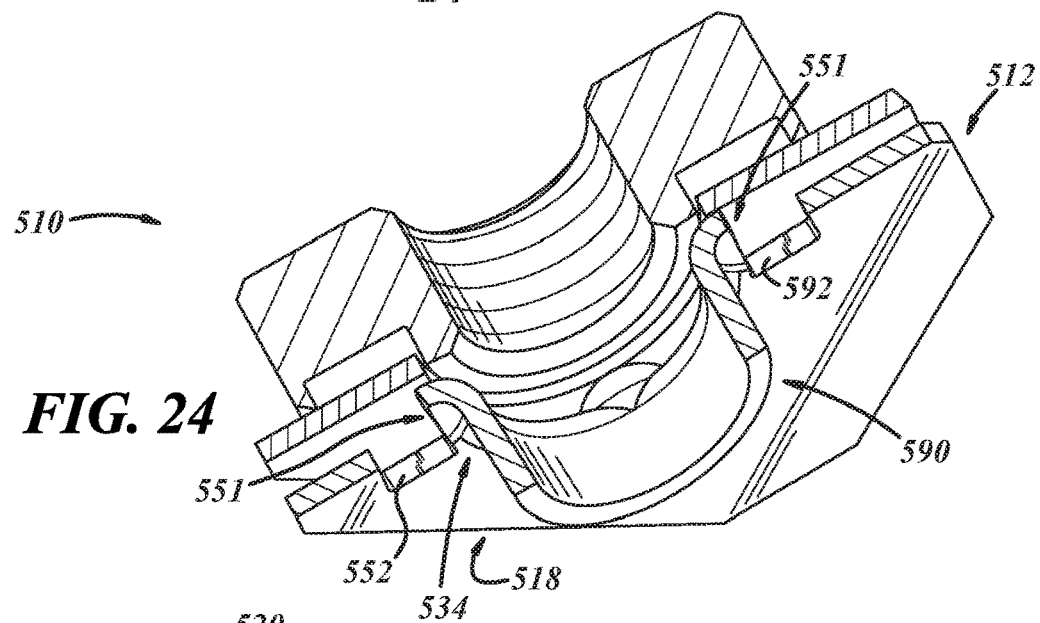
FIG. 24 illustrates an enlarged cross-sectional view of the assembly of FIG. 20, taken along line 24-24 of FIG. 23.
Figure 25:
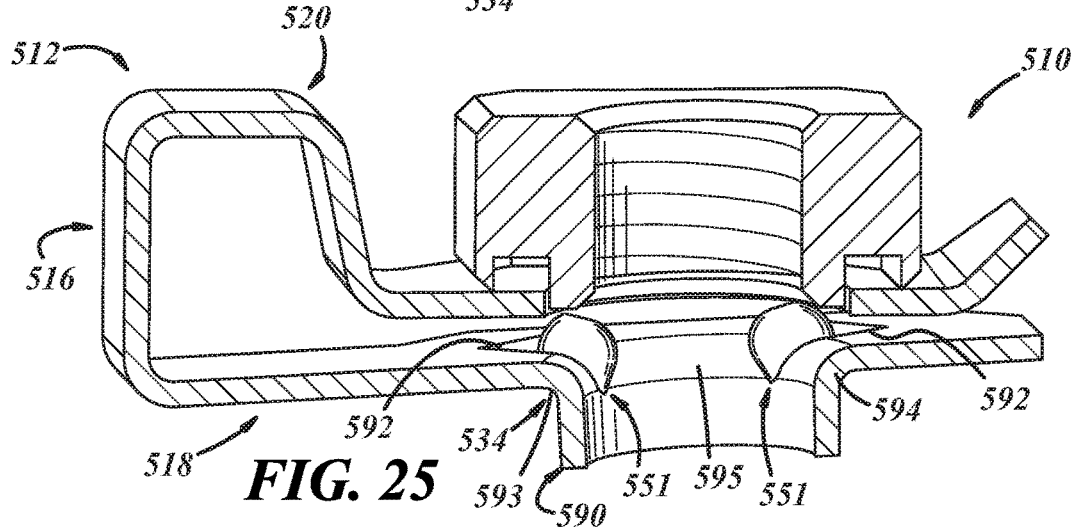
FIG. 25 illustrates an enlarged cross-sectional view of the assembly of FIG. 20, taken along line 25-25 of FIG. 22.

With reference to FIGS. 23 through 25, the dimples 551 may be produced using material from the first leg 518 located radially between radially inner edges of the cutouts 592 and the ring 590. Accordingly, portions of the dimples 551 may intersect a rounded transition 594 between the apertured portion 534 of the first leg 518 and the ring 590. As shown in FIG. 23, portions of the dimples 551 may intersect an incurvate surface 593 of the rounded transition 594. As shown in FIG. 25, portions of the dimples 551 may intersect an excurvate surface 595 of the rounded transition 594.

As used in this patent application, the terminology "for example," "for instance," "like," "such as," "comprising," "having," "including," and the like, when used with a listing of one or more elements, is open-ended, meaning that the listing does not exclude additional elements. Likewise, when preceding an element, the articles "a," "an," "the," and "said" mean that there are one or more of the elements. Moreover, directional words such as front, rear, top, bottom, upper, lower, radial, circumferential, axial, lateral, longitudinal, vertical, horizontal, transverse, and/or the like are employed by way of example and not limitation. As used herein, the term "may" is an expedient merely to indicate optionality, for instance, of an element, feature, or other thing, and cannot be reasonably construed as rendering indefinite any disclosure herein. Other terms are to be interpreted and construed in the broadest reasonable manner in accordance with their ordinary and customary meaning in the art, unless the terms are used in a context that requires a different interpretation.

Finally, the present disclosure is not a definitive presentation of an invention claimed in this patent application, but is merely a presentation of examples of illustrative embodiments of the claimed invention. More specifically, the present disclosure sets forth one or more examples that are not limitations on the scope of the claimed invention or on terminology used in the accompanying claims, except where terminology is expressly defined herein. And although the present disclosure sets forth a limited number of examples, many other examples may exist now or are yet to be discovered and, thus, it is neither intended nor possible to disclose all possible manifestations of the claimed invention. In fact, various equivalents will become apparent to artisans of ordinary skill in view of the present disclosure and will fall within the spirit and broad scope of the accompanying claims. Features of various implementing embodiments may be combined to form further embodiments of the invention. Therefore, the claimed invention is not limited to the particular examples of illustrative embodiments disclosed herein but, instead, is defined by the accompanying claims.

The invention claimed is:

1. A retainer, comprising:
    a base wall, and
    first and second legs extending away from the base wall, wherein,
        the first leg has a first apertured portion including an aperture through the first leg and a dimple array projecting from an inboard surface of the first leg, surrounding the aperture, and including at least three circumferentially spaced dimples, and
        the second leg has a second apertured portion corresponding to the first apertured portion of the first leg.

2. The retainer of claim 1, wherein the dimples include four dimples, wherein two of the four dimples are disposed on one side of a longitudinal axis of the retainer and another two of the four dimples are disposed on another side of the longitudinal axis, such that the longitudinal axis does not intersect any one dimple.

3. The retainer of claim 1, wherein the dimples include rounded, shell-shaped bodies having excurvate inboard surfaces facing radially inwardly, and incurvate outboard surfaces facing radially outwardly.

4. The retainer of claim 1, wherein the first leg also has a ring extending away from an outboard surface of the first apertured portion, and a cutout array surrounding the aperture, corresponding to the dimple array, and including at least three cutouts corresponding to the at least three dimples.

5. The retainer of claim 1, wherein
    the first leg also has a necked portion extending away from the base wall and having a first base, and a set of first shoulders extending away from the base, wherein the first apertured portion extends away from the set of first shoulders of the necked portion, and
    the second leg also has a necked and stepped portion extending away from the base wall, and having a second base, a step extending away from the second base, and a shouldered portion extending away from the step and having a set of second shoulders extending laterally outwardly, wherein the second apertured portion extends away from the set of second shoulders.

6. The retainer set forth in claim 5, wherein a ratio between a height of the base wall to a width of the base wall is between 0.62 and 0.92.

7. The retainer set forth in claim 5, wherein a ratio between a height of the base wall and a height of a space between the apertured portions of the legs is between 1.4 and 2.0.

8. The retainer set forth in claim 5, wherein a ratio between a width of the base wall and a width of the free ends of the legs is between 0.5 and 1.2.

9. The retainer set forth in claim 5, wherein the second base is planar.

10. The retainer set forth in claim 5,
    wherein the base wall is located at a rearward portion of the retainer and the first and second legs terminate at a forward portion of the retainer,
    wherein the first leg has a first fixed end at the base wall, and a first free end distal the first fixed end,
    wherein the necked portion extends away from the first fixed end,
    wherein the first apertured portion extends toward the first free end and has a first outboard surface, a first inboard surface, first laterally opposite sides extending between the first outboard and inboard surfaces, and a first aperture being disposed between the first laterally opposite sides and the first outboard and inboard surfaces, wherein the second leg has a second fixed end at the base wall and a second free end distal the second fixed end, and the second base of the necked and stepped portion extends away from the second fixed end toward the second free end, and the step of the necked and stepped portion extends in a forward direction and toward the first leg, and wherein the second apertured portion extends toward the free end and has a second outboard surface, a second inboard surface facing the first inboard surface, second laterally opposite sides extending between the second outboard and inboard surfaces, and a second aperture being disposed between the second laterally opposite sides and the second outboard and inboard surfaces.

11. A retainer and nut assembly, comprising:
the retainer set forth in claim 5, and
a nut coupled to the second leg of the retainer.

12. The retainer and nut assembly set forth in claim 11, wherein the nut is a square nut.

13. The retainer and nut assembly set forth in claim 11, wherein the nut is a round nut, having a collar, a free end boss extending from the collar, a fixed end boss extending from the collar in a direction opposite that of the free end boss, a circumferentially extending channel in an undersurface of the collar to accept the indented portion when the retainer is staked to the nut and radially extending ribs in the channel to cooperate with the indented portion to resist rotation of the nut with respect to the retainer.

* * * * *